Sept. 22, 1942.   C. FARNY   2,296,781
METHOD OF MAKING PLYWOOD TUBING
Filed July 22, 1940   3 Sheets-Sheet 1
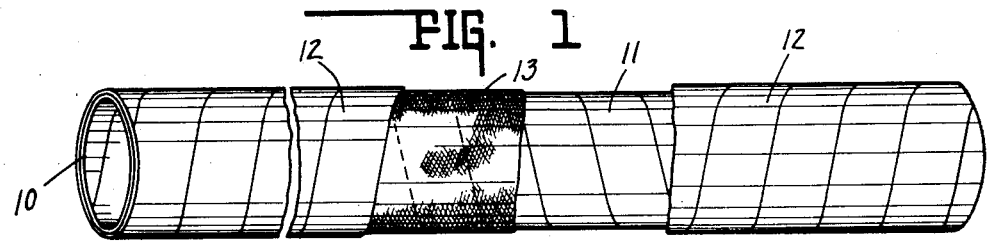
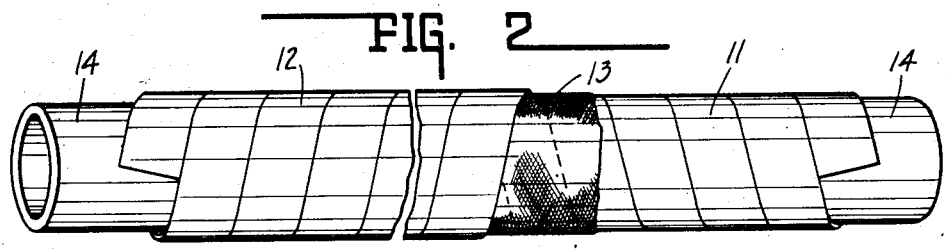
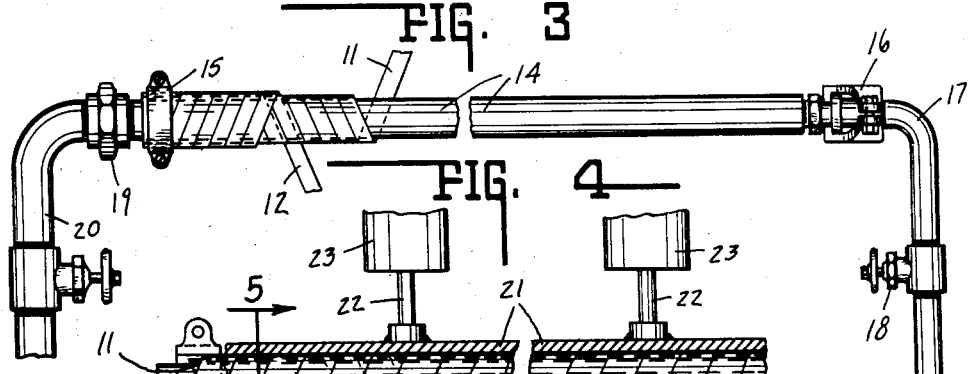
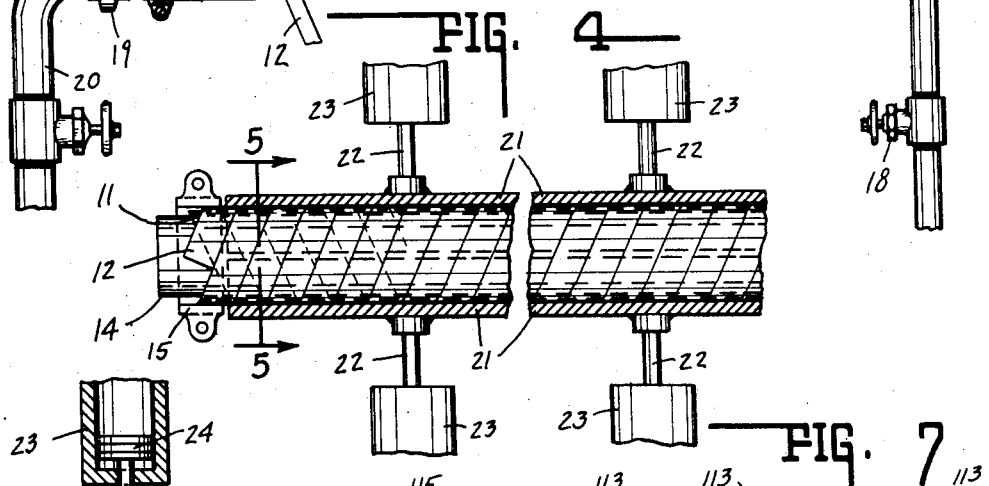
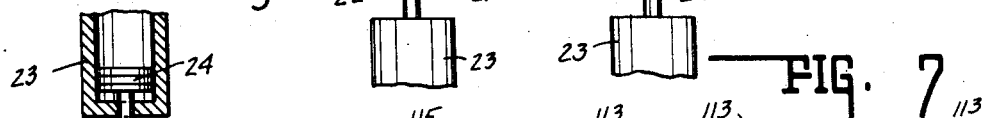
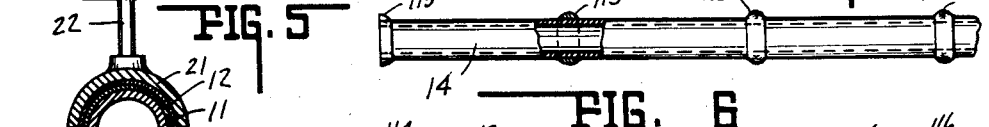
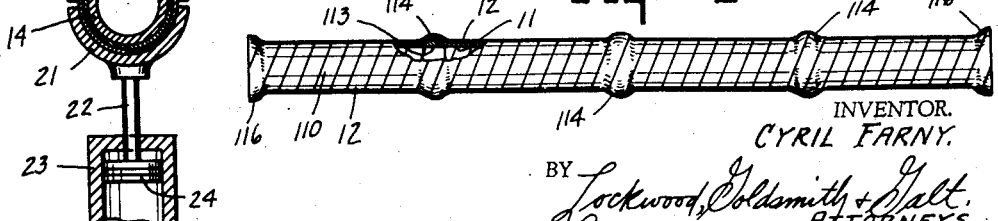
INVENTOR.
CYRIL FARNY.
BY Lockwood, Goldsmith & Galt
ATTORNEYS.

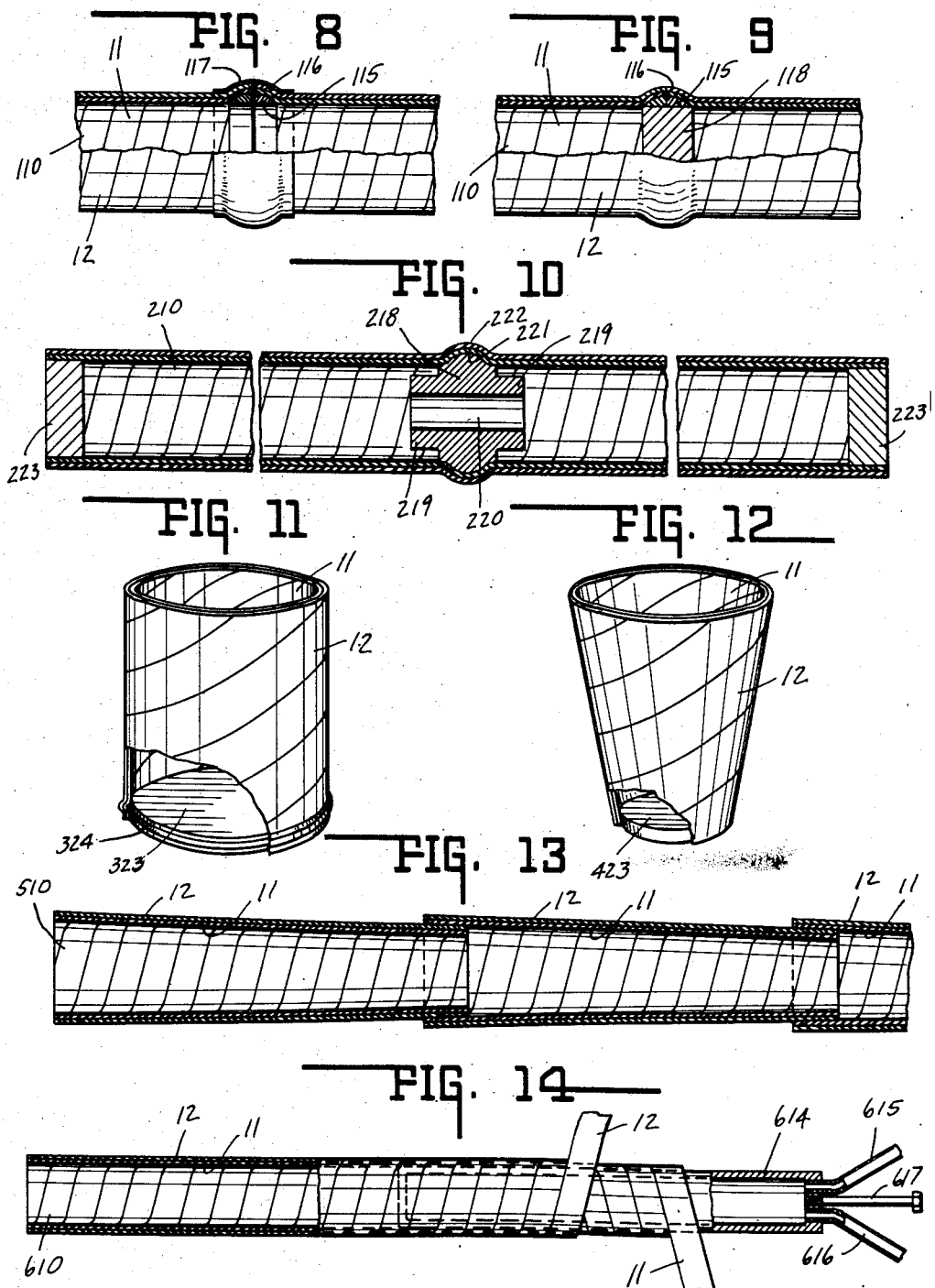

Sept. 22, 1942.  C. FARNY  2,296,781
METHOD OF MAKING PLYWOOD TUBING
Filed July 22, 1940  3 Sheets-Sheet 3
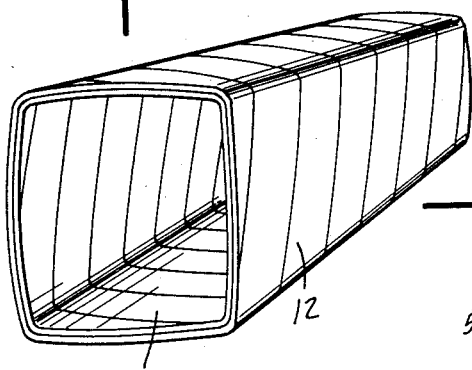
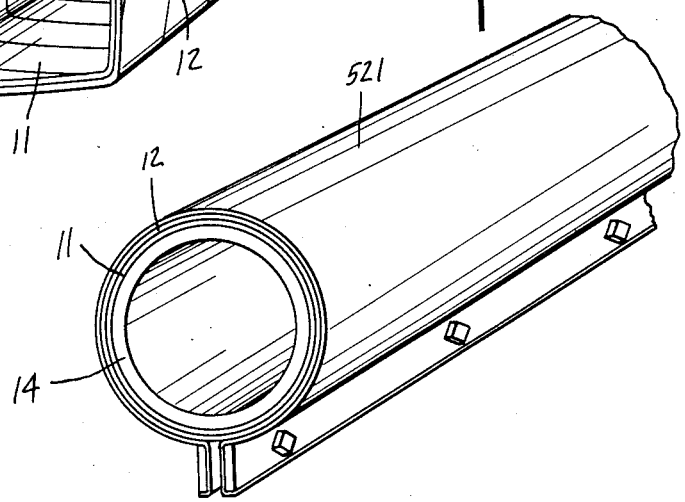
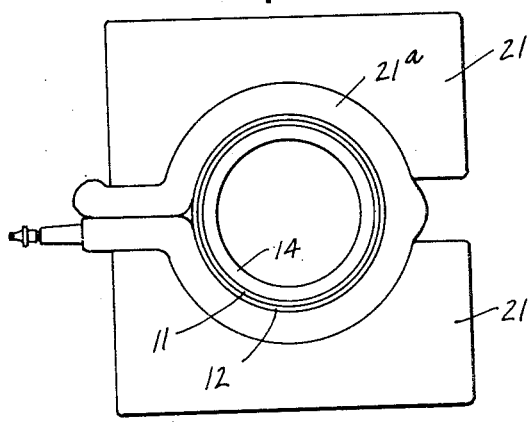
INVENTOR.
CYRIL FARNY.
BY Lockwood Goldsmith & Galt.
ATTORNEYS.

Patented Sept. 22, 1942

2,296,781

UNITED STATES PATENT OFFICE 2,296,781

METHOD OF MAKING PLYWOOD TUBING

Cyril Farny, St. Charles, Ill., assignor to The Rudolph Wurlitzer Company, Cincinnati, Ohio, a corporation Application July 22, 1940, Serial No. 346,718

3 Claims. (Cl. 144—309)

This invention relates to the method of producing a multi-ply wood veneer structural tubing having many applications and uses, such as structural rods, beams and the like, airplane parts, conduits, containers and shelters.

Essentially, the invention pertains to the method of producing a tubing of varying cross sectional shape formed of wood veneer strips, spirally wound in opposite directions and in overlapping relation to form a multi-ply structure reinforced with a binding of thermo-setting resin glue, and set in its form under heat and pressure.

More specifically, and for example, the form or core upon which the tubing is produced may be in the nature of a steam pipe about which two or more layers of wood veneer strips are spirally wound with the windings and grain of each successive layer extending in opposite directions. In this form and under tension they are bonded with an intermediate coating of a thermo-setting resin glue. After the winding of the strips has been completed, they are subjected to conforming pressure and heat which may be developed by passing steam through the pipe. Following such treatment of pressure and heat, the veneer winding is slidably removed longitudinally of the pipe, resulting in a tubular structure of great strength, lightness and durability, having many advantageous uses.

A further feature of the invention resides in winding and pressing the oppositely directed spiral strips to develop a localized peripheral rib or bulge for reinforcement and interlocking purposes. Thus, a sealing plug, or cap, reinforcing and nailing disks or the like, may be incorporated in the tubing or provided for. Such bulge may also be in the form of flared ends to provide interlocking joints.

Another feature of the invention resides in the ability of the oppositely directed spiral windings to form a continuous unbroken tubing of great length, such as a cross country pipe line. Also such windings permit of tapered tubing to provide for telescoping ends or sections.

Such wood veneer tubing may be produced at low cost and be impervious to the action of water, heat and cold, and resistant to fire. Also, for structural purposes, it will not be affected by termites. The relation of its strength to its lightness and thickness of material is more favorable than most metals, including aluminum. Thus, it is found to be actually stronger than aluminum tubing of the same thickness. As a result of the above qualities, its uses would appear to be extensive. Structurally it is adapted for use as struts, tie rods, beams and joists. It may be used as piping for fluids, either above or underground and to that end may be made continuous without joints on the job. In various forms it may be produced for use as containers, such as cups, tumblers and the like, and larger diameters for sections of airplane fuselage and wings, as well as culverts, shelters and many other uses which need not be here enumerated.

The full nature of the invention will be understood from the accompanying drawings and the following description and claims:

Fig. 1 is a perspective view showing a section of finished tubing with a portion of the outer veneer being broken away to disclose the inner layer of veneer. Fig. 2 is a perspective view of the first and second layers of veneer wound upon an inner form or core with a portion of the outer layer being broken away to disclose a portion of the inner layer. Fig. 3 illustrates one form of a removable steam pipe associated with steam fittings about which the veneer strips are being wound. Fig. 4 is an enlarged view of a section of the steam pipe showing the clamping members in section. Fig. 5 is a section taken on the line 5—5 of Fig. 4. Fig. 6 shows a modified form of tubing with reinforcing ribs and joint forming ends. Fig. 7 is a section of pipe or core upon which the tubing of Fig. 6 is formed. Fig. 8 shows a joint connection between two tubes, as illustrated in Fig. 6, with the upper portion thereof shown in section. Fig. 9 is the same as Fig. 8, illustrating the use of an internal plug at the pipe joints. Fig. 10 shows a vertical section through a portion of the tubing having an inner reinforcing plug formed therein and closure plugs at both ends. Fig. 11 is a perspective view of a section of tubing formed as a container. Fig. 12 is a perspective view of a section of tubing in the form of a tapered container. Fig. 13 is a section through a series of tapered tubes formed for permitting telescopic interlocking thereof. Fig. 14 is a diagrammatical illustration of the method for producing an endless tubing. Fig. 15 is a modification showing the structure in a substantially rectangular and tapered form. Fig. 16 is a perspective view illustrating a spring steel or rubber external pressure exerting member. Fig. 17 is the same as Fig. 5 showing a resilient bag within the clamping members.

In the drawings there is shown for purpose of illustration, and as one example of the invention, a tube 10 comprising an inner layer formed of a spirally wound plywood or wood veneer strip 11 having its abutting edges secured and sealed by the application of a thermosetting resin glue. Surrounding the inner layer and spirally wound thereabout in the opposite direction, there is a second layer formed of a wood veneer or plywood strip 12 having the adjacent edges similarly sealed and secured by such glue, and wherein a coating of such glue is provided between the two layers so that they will rigidly adhere together and be inseparable.

Depending upon the strength and size of the tubing to be produced, any desired number of layers may be applied; there being only two such layers illustrated herein for convenience. Thus, the tubing may be of two ply, as shown, or three or more plies, if desired, each ply or layer having its veneer strip spirally wound in the opposite direction to that of the next underlying ply. Between each ply a coating of thermo-setting resin glue is applied, as well as along the edges of the spirally wound strips of each ply. Similarly, where desired, each ply may be covered by a fabric indicated at 13, which fabric is impregnated with the said glue to provide further strengthening and moisture-proofing of the inner liner. However, in many uses of the tubing such fabric liner need not be employed.

As shown in Figs. 2 and 3, there is provided a steam pipe 14 which serves as an inner core or form for receiving the first wrapping of the veneer strip 11. The ends of the veneer strips are clamped adjacent the end of the pipe 14 by a clamp 15. As illustrated herein, in the two ply tube both strips may be secured at the same end of the pipe and simultaneously wound thereabout. It may, however, be desirable, and particularly wherein a large number of layers are employed, to clamp the ends of the strips at different ends of the pipe and wind them separately. It is not desirable that the strips be tightly wound upon the pipe; in fact, it is preferable to permit a certain amount of looseness in order that the finished tubing may be conveniently removed from the pipe by sliding the same off of one end thereof. Before the winding or after each under strip is wound, it is treated with an application of thermo-setting resin glue over its outer or exposed surface.

As shown herein the pipe is held stationary while the veneer strips are spirally wound thereabout. However, this process may be reversed, wherein the pipe is rotated to effect the spiral winding of the strips thereabout.

The pipe 14 is herein shown as removably connected and supported at one end by a steam coupling 16 connected with a steam pipe 17 and controlled by a steam valve 18. The opposite end of the pipe is removably connected and supported by a steam joint 19 on a steam outlet connection 20.

After the spiral wrapping of the veneer strips has been completed, the clamps 21 are brought to bear against opposite sides of the veneer tubing so as to embrace it, as shown in Figs. 4 and 5. The tubing is thereby subjected to a pressure of substantially 100 pounds per square inch, while at the same time giving the desired form to the exterior surface thereof. Any suitable exterior pressure applying means may be employed, that herein illustrated for example being in the nature of an oversize pipe split longitudinally with its opposite split sides mounted upon connecting rods 22 operating in the oppositely-disposed steam chests 23 through the medium of pistons 24 secured to said rods.

Substantially simultaneously with the application of the external pressure, heat is applied by passing steam through the pipe 14 acting as a core about which the veneer is wrapped. It is preferable to bring the temperature of the pipe and, therefore, the internal surface of the tubing up to approximately two to three hundred degrees. Under this temperature and the applied external pressure, the outer finished surface of the tubing will take its final form and the thermo-setting resin glue will become finally set. After being subjected to such temperature and pressure, the clamps are removed, the pipe is disconnected from its steam coupling and joint, whereupon the tubing which has been loosely wound thereon may be readily slid off of one end.

As illustrated in Figs. 6 and 7, the tubing 110 may be similarly formed but with spaced reinforcements in the form of collars 113. Thus, the pipe 14 may be provided about its surface with a reinforcing collar built up of plywood, fabric or metal about which the veneer strips are wrapped, as above described. In this instance, however, suitable recesses must be provided in the pressure applying clamps to accommodate the rib or bulge, indicated at 114, produced by the collar. Heat and pressure thereupon will form the plywood strips wrapped thereabout so that when the tubing is removed from the pipe, the reinforcing collars will be imbedded therein.

Similarly, and wherein required, the ends of the tubing may be flared, as illustrated in Figs. 6 and 7, by providing a corresponding form therefor, indicated at 115. This form will provide the tubing with a flared mouth at one or both ends thereof, as indicated at 116.

The flared mouth 116 at the ends of the tubes may be utilized for joining sections of the tubing together, as shown in Figs. 8 and 9. The abutting flared ends of the tubing will provide a peripheral bulge which will permit interlocking with the coupling indicated at 117, which may be in the form of pressed veneer or a fabric cemented about the adjacent ends of the tubing and interlocking with the flared ends thereof by the thermo-setting glue. The end forms 115 may be removed, if desired, or, as shown in Figs. 8 and 9, they may be retained within the flared ends of the tubing for reinforcing purposes.

In Fig. 9 the joined ends of the tubing may be further reinforced by the cylindrical block 118 secured within the forms 115 through which medium the ends of the tubing will be interlocked and secured.

As illustrated in Fig. 10, a continuous tubing may be formed about two sections of aligned pipe having their ends abutting a block 218, said block having reduced portions 219 extending into the respective adjacent ends of the pipe and a steam passage 220. The extended periphery of the block may be provided with a bead 221 about which the veneer strips are formed and pressed to leave the bulge 222 therein. Where desired, end blocks 223 may be secured within the open ends of the tubing after the pipe sections are removed therefrom.

Similar arrangements of internally positioned blocks may be employed wherein the use to which the tubing is put requires nailing at spaced intervals.

As illustrated in Fig. 11, one end of the tubing may be closed by a disk 323, by forming and pressing the veneer strips about its periphery which may be provided with an interlocking bead 324, the disk being glued therein. In such manner suitable containers or tumblers may be produced.

As illustrated in Fig. 12, the tubing may be of conical or tapered form for various purposes, that illustrated herein being employed as a cup having the bottom closed by a plug 423.

Fig. 13 is further illustrative of the conical or tapered form of tubing 510, whereby a continuous line of tubular sections may be formed by telescoping the ends.

In Fig. 14 there is diagrammatically illustrated a method of continuously forming tubing 610, of any desired length. Thus, in laying a pipe line the tubing may be formed on the ground where it is to be laid without joints, by continuously progressing with its formation. In this connection there is provided a steam pipe 614 having one end closed and the other end provided with a steam inlet 615 and an outlet 616. A suitable pull rod 617 is provided for pulling the steam pipe forwardly to form a new portion of the tubing after completing the formation of the preceding portion thereof. Any suitable clamping device, such as illustrated in Figs. 4 and 5, may be employed for applying external pressure to each portion of the tube as it is being formed while steam is introduced into the pipe 614. The pressure may be exerted by such clamping device by means of screws, toggles or the like in any well known manner, instead of by steam pressure. As fast as one portion of the tubing is completed, the external pressure may be released, the pipe 614 pulled therefrom and again wrapped to form the succeeding portion, after which the pressure and heat may again be applied. These operations may continue indefinitely for producing a continuous length of tubing without joints.

Whereas one example has been above described in respect to producing the tubing wherein exterior presses are employed for exerting pressure thereabout, it may be mentioned that an alternative arrangement may be used to apply the external pressure, such as by securely wrapping the veneer with a flexible material, such as spring steel or rubber 521 (Fig. 16) of suitable width to exert the desired pressure thereon while the veneer is being subjected to heat. Furthermore, the method of applying heat may be reversed, wherein the exterior clamping members are provided with heating units or equipped for the reception of steam, as distinguished from the heat being applied to the inner core or steam pipe about which the strips are wound as above described.

Such an arrangement is illustrated in Fig. 17, wherein the clamps 21 are provided with an internal resilient pressure applying member 21a. Said member may be in the form of hard or sponge rubber, or may be a pneumatic rubber bag into which air, steam, oil or water is introduced for expanding the bag. Thus, the pressure may be equalized and exerted radially inwardly against the entire circumference of the tubing. Furthermore, the heat may be applied, as well as the pressure, through the medium of the bag 21a wherein steam, hot water or oil is introduced.

Whereas the tubing has been herein illustrated as cylinrical or circular in cross section, it is obvious that it may be of various other cross sectional shapes, such as oval or rectangular with rounded edges or the like, as illustrated in Fig. 15. Thus, other tubular shapes similarly formed and constructed are provided which may be suitable for the production of sections of fuselage of airplanes, wings, pontoons, simulation of logs for log cabin construction and the like. In such structural formation, the outer surface may be highly decorated, since fine veneers may be used with decorative effects produced by the natural wood grains. Also, it may be noted that the tubes being hollow, provide excellent insulation in building and similar structural work.

The invention claimed is:

1. The method of producing structural tubing consisting in providing a core of substantially the diameter and cross sectional shape of the interior of the tubing to be produced, mounting a radially protruding forming collar about the peripheral surface of said core, spirally winding a strip of wood veneer in one direction about said core and over said collar, applying a coating of thermosetting resin glue over the surface of said winding, spirally winding a second strip of wood veneer in the opposite direction about said first winding and over the coating of glue and said collar, and simultaneously applying heat and pressure to said veneer for pressing and setting it under tension about said core and collar, whereby said collar will be interlocked with and form a part of said tubing and cause an annular rib to be formed about the outer surface thereof.

2. The method of producing structural tubing, consisting in providing a core having a radially protruding forming collar removably mounted aobut the periphery thereof, spirally winding overlapping strips of wood veneer in opposite directions about said core and collar, applying a coating of water resistant binder over the inner adjacent surfaces of said strips, and simultaneously applying heat and pressure thereto to form said strips over said protruding collar to conform with the radially protruding surface thereof and effect an interlocking connection therewith.

3. The method of producing structural tubing consisting in providing a core, mounting a reinforcing closure member upon one end of said core with its periphery protruding radially outwardly from and about the periphery of said core, spirally winding overlapping strips of wood veneer about said core and member, applying a coating of water resistant binder over the inner adjacent surfaces of said strips, and simultaneously applying heat and pressure to said strips for causing them to conform to the exterior of said core and member in interlocking engagement with said member.

CYRIL FARNY.